(12) United States Patent
Sung et al.

(10) Patent No.: US 8,428,120 B2
(45) Date of Patent: Apr. 23, 2013

(54) METHOD AND APPARATUS OF BAYER PATTERN DIRECT VIDEO COMPRESSION

(75) Inventors: Chih-Ta Star Sung, Glonn (DE); Eckehard Steinbach, Olching (DE); Yin-Chun Blue Lan, Wurih Township, Taichung County (TW); Hu Chen, Munich (DE); Mingzhe Sun, Jhu Dong Township, Hsinchu County (TW)

(73) Assignee: Taiwan Imagingtek Corporation, Juhdong (TW)

( * ) Notice: Subject to any disclaimer, the term of this patent is extended or adjusted under 35 U.S.C. 154(b) by 1532 days.

(21) Appl. No.: 12/001,190

(22) Filed: Dec. 11, 2007

(65) Prior Publication Data

US 2009/0174811 A1  Jul. 9, 2009

(51) Int. Cl.
*H04N 19/00951* (2006.01)
(52) U.S. Cl.
USPC .................................................. 375/240.01

(58) Field of Classification Search ................ None
See application file for complete search history.

(56) References Cited

U.S. PATENT DOCUMENTS

| | | | | |
|---|---|---|---|---|
| 3,971,065 | A * | 7/1976 | Bayer | 348/276 |
| 6,192,162 | B1 * | 2/2001 | Hamilton et al. | 382/266 |
| 6,356,276 | B1 * | 3/2002 | Acharya | 345/600 |
| 7,773,127 | B2 * | 8/2010 | Zimmer et al. | 348/231.6 |
| 8,004,544 | B1 * | 8/2011 | Zhang et al. | 345/690 |
| 2002/0191104 | A1 * | 12/2002 | Matsutani et al. | 348/441 |
| 2006/0268155 | A1 * | 11/2006 | Takagi et al. | 348/370 |
| 2008/0075394 | A1 * | 3/2008 | Huang et al. | 382/300 |

\* cited by examiner

*Primary Examiner* — Nhon Diep

(57) ABSTRACT

Applying a mechanism of image signal processing and color-space-conversion to convert the captured Green components to be Y, luminance components for only those pixels having raw Green data without interpolation, and to convert the Blue components to be U, chrominance components for only those pixels having raw Blue data, and Red components to be V, chrominance components for only those pixels having raw Red data. These converted YUV components are input to a predetermined video compression codec for reducing the intra- and inter-frame redundant information.

14 Claims, 8 Drawing Sheets

METHOD AND APPARATUS OF BAYER PATTERN DIRECT VIDEO COMPRESSION

BACKGROUND OF THE INVENTION

1. Field of Invention

The present invention relates to the video compression and decompression techniques, and particularly relates to the video compression for simplifying the compression procedure and reducing the requirements of image buffer size, I/O bandwidth and the power consumption.

2. Description of Related Art

In the past decades, the semiconductor technology migration trend has driven the digital image and video compression and display feasible and created wide applications including digital still camera, digital video recorder, web camera, 3G mobile phone, VCD, DVD, Set-top-box, Digital TV, . . . etc.

Most commonly used video compression technology like the MPEG and JPEG take the procedure of image and video compression in the YUV (Y/Cr/Cb) pixel format which is from converting the digitized raw color data with one color component per pixel to three color components (Red, Green and Blue or so named RGB) per pixel and further converting to YUV as shown in the prior art procedure of image/video compression and display in FIG. 1. Most video compression algorithms require that the image sensor transfer the image pixels to a temporary image buffer for compression, under this kind mechanism, the pixel data amount shoots to three components from only one captured in the image sensor which requires quite a lot storage device density and needs a temporary buffer to store it. Data transferring from the image sensor to the temporary image buffer and back to the video compression engine causes delay time and requires high I/O bandwidth in data transferring and dissipates quite high power consumption.

This invention takes new alternatives and more efficiently overcomes the setbacks of prior art video compression with much less cost of semiconductor die area and chip/system packaging. With the invented method, an apparatus of integrating most image and video compression function with the image sensor chip or a smaller module becomes feasible.

SUMMARY OF THE INVENTION

The present invention of the high efficiency video compression and decompression method and apparatus significantly reduces the requirement of I/O bandwidth, memory density and operation times by taking some innovative approaches and architecture in realizing a product which results in waiving the off-chip temporary memory buffer and sharply reducing power consumption.

According to an embodiment of the present invention, raw image of Bayer pattern data is converted to YUV format with Y converted from G (Green) only on the position which has Green component which results in half of the Y component compared to conventional means of Y for each pixel.

According to an embodiment of the present invention, raw image of Bayer pattern data is converted to YUV format with U converted from B (Blue) only on the position which has Blue component, which results in more accurate position of U compared to the conventional means of a shifted U position.

According to an embodiment of the present invention, raw image of Bayer pattern data is converted to YUV format with V converted from R (Red) only on the position which has Red component.

The present invention of the high efficiency video compression and decompression directly takes raw image data output from the image sensor with one color component per pixel and compression the image frame data before saving to an on-chip temporary image buffer.

The present invention of the high efficiency video compression and decompression searches for the "best matching" position by calculating the SAD by using the raw pixel data in stead of the commonly used Y-component or so named "Luminance".

According to an embodiment of the present invention of the high efficiency video compression, a compression engine compresses the raw mage and temporarily stores to the on-chip frame buffer and decompresses the region of pixels for motion estimation in video compression.

Other aspects and advantages of the present invention will become apparent from the following detailed description, taken in conjunction with the accompanying drawings, illustrating by way of example the principles of the invention. It is to be understood that both the foregoing general description and the following detailed description are by examples, and are intended to provide further explanation of the invention as claimed.

DESCRIPTION OF THE PREFERRED EMBODIMENTS semiconductor technology migration trend has driven the digital image and video compression to be feasible and created wide applications including digital still camera, digital video recorder, web camera, 3G mobile phone, VCD, DVD, Set-top-box, Digital TV, . . . etc. Most electronic devices within an image related system include a semiconductor image sensor functioning as an image capturing device as shown. The image sensor can be a CCD or a CMOS image sensor. Most image and video compression algorithms, like JPEG and MPEG have been developed in late 1980s' or early 1990s'. The CMOS image sensor technology was not mature then. The CCD sensor has inherit higher image quality than the CMOS image sensor and has been used in applications requires image quality like scanner, high-ended digital camera or camcorder or surveillance system or the video recording system. Image and video compression techniques are applied to reduce the data rate of the image or video stream. When image sensor density is shooting up, compression plays more critical role for saving the requirement of memory density, time and I/O bandwidth in transmission.

Figure 1:
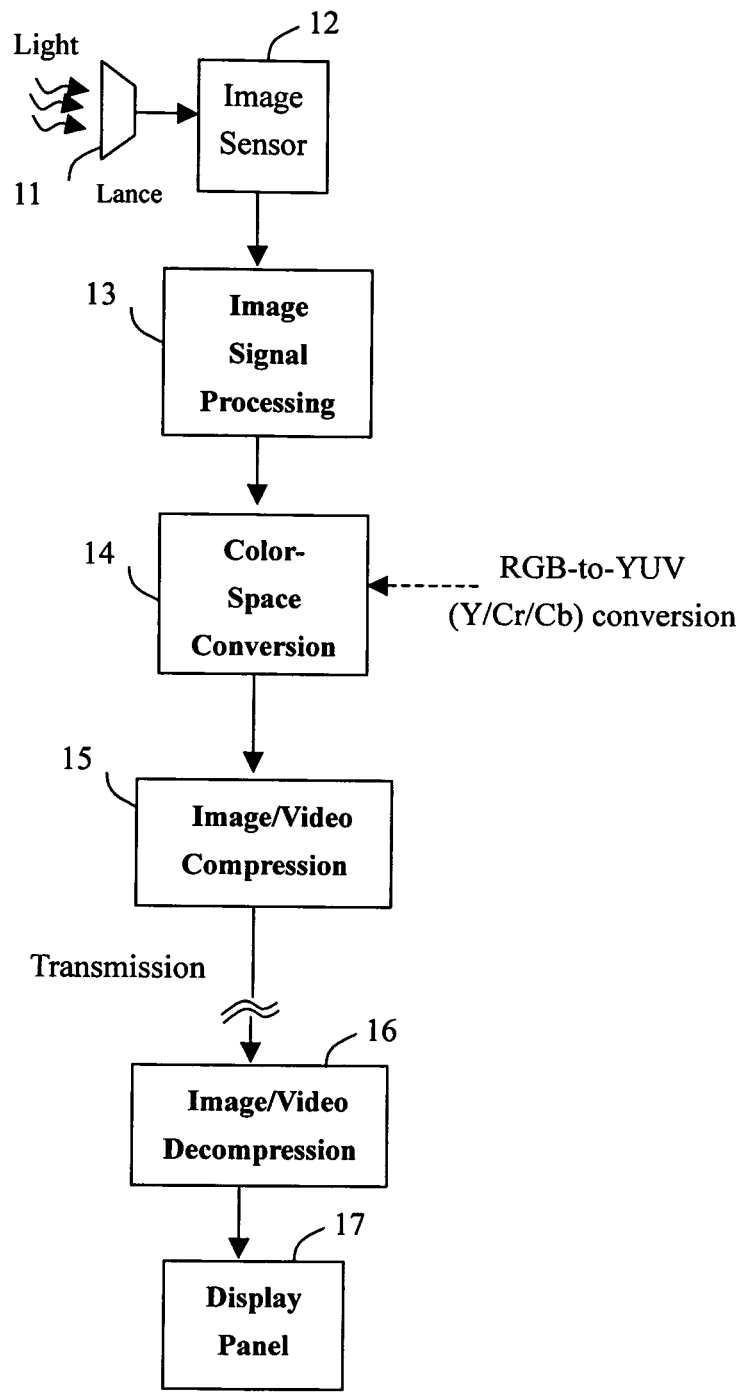
FIG. 1 depicts the process of image processing, compression, transmission, decompression and display.

The basic image capturing and compression procedure is shown as in FIG. 1, the image sensor 12 captures image information of the light shooting through a lens 11. The captured pixels signal stored in the image sensor is weak and needs procedure of signal processing before being digitized by an analog-to-digital converter, (or so called ADC) to an output format. The digitized pixel data which can be either 6 bits, 8 bits, 10 bits, 12 bits, 14 bits or 16 bits has most likely one color component per pixel and will go through an image color processing 13 and to be converted to be three color components per pixel including Red, Green and Blue (R, G, B). The image signal processing 13 includes but not limited the following steps: white balance, gamma correction and color compensation. The later applies an interpolation method to calculate two neighboring color components to form three color components per pixel. The RGB pixels are then further converted to be YUV (and/or Y, Cr, Cb) format for video or image compression. Y, the Luma is the component representing the brightness, U and V (or Cr/Cb), Chroma, are the relative color components. Most image and video compression 15 takes YUV pixel format as the input pixel data to take advantage of human being's vision which is more sensitive to brightness than color and take more brightness data and less color components in compression. In the display point of view, a decompression procedure 16 decompresses and recovers the received pixel image of YUV/YCrCb and converts to RGB format with 3 color components per pixel and sends to the display device 17.

Figure 2:
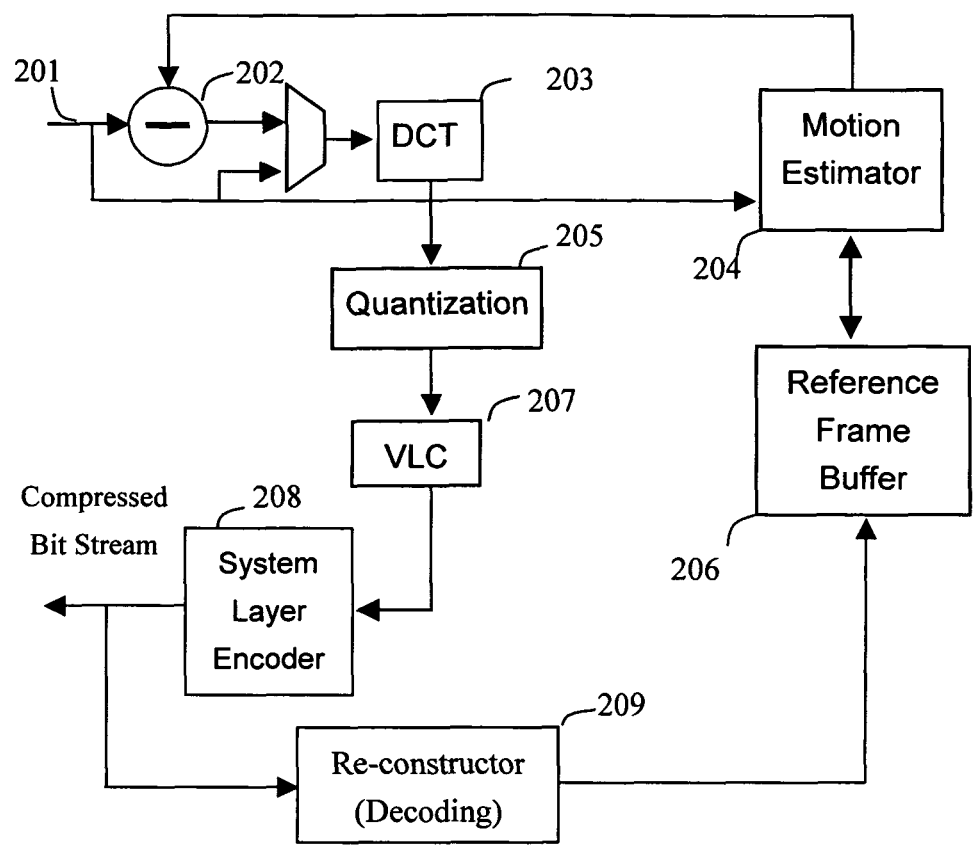
FIG. 2 depicts the diagram of the basic video compression.

FIG. 2 illustrates the block diagram and data flow of a widely used MPEG digital video compression procedure, which is commonly adopted by compression standards and system vendors. This MPEG video encoding module includes several key functional s: The predictor 202, DCT 203, the Discrete Cosine Transform, quantizer 205, VLC encoder 207, Variable Length encoding, motion estimator 204, reference frame buffer 206 and the re-constructor (decoding) 209. The MPEG video compression specifies I-frame, P-frame and B-frame encoding. MPEG also allows macro—as a compression unit to determine which type of the three encoding means for the target macro-. In the case of I-frame or I-type macro encoding, the MUX selects the coming pixels 201 to go to the DCT 203, the Discrete Cosine Transform, the module converts the time domain data into frequency domain coefficient. A quantization step 205 filters out some AC coefficients farer from the DC corner which do not dominate much of the information. The quantized DCT coefficients are packed as pairs of "Run-Level" code, which patterns will be counted and be assigned code with variable length by the VLC Encoder 207. The assignment of the variable length encoding depends on the probability of pattern occurrence. The compressed I-type or P-type bit stream will then be reconstructed by the re-constructor 209, the reverse route of compression, and will be temporarily stored in a reference frame buffer 206 for next frames' reference in the procedure of motion estimation and motion compensation. As one can see that any bit error in MPEG stream header information will cause fatal error in decoding and that tiny error in data stream will be propagated to following frames and damage the quality significantly A still image compression, like JPEG is similar to the I-frame coding of the MPEG video compression. An 8×8 of Y, Cr and Cb pixel data are compressed independently by going through similar procedures of the I-frame coding including DCT, quantization and a VLC coding.

The Best Match Algorithm, BMA, is the most commonly used motion estimation algorithm in the popular video compression standards like MPEG and H.26x. In most video compression systems, motion estimation consumes high computing power ranging from ~50% to ~80% of the total computing power for the video compression. In the search for the best match macro, for reducing the times of computing, a searching range 39 is defined according to the frame resolution, for example, in CIF (352×288 pixels per frame), +/−16 pixels in both X- and Y-axis, is most commonly defined. The mean absolute difference, MAD or sum of absolute difference, SAD as shown below, is calculated for each position of a block within the predetermined searching range, for example, a +/−16 pixels of the X-axis $$SAD(x, y) = \sum_{i=0}^{15}\sum_{j=0}^{15} |V_n(x+i, y+j) - V_m(x+dx+i, y+dy+j)| \quad \text{(Eq. 1)}$$

$$MAD(x, y) = \quad \text{(Eq. 2)}$$
$$\frac{1}{256}\sum_{i=0}^{15}\sum_{j=0}^{15} |V_n(x+i, y+j) - V_m(x+dx+i, y+dy+j)|$$

and Y-axis. In above MAD and SAD equations, the $V_n$ and $V_m$ stand for the 16×16 pixel array, i and j stand for the 16 pixels of the X-axis and Y-axis separately, while the $d_x$ and $d_y$ are the change of position of the macro. The macro with the least MAD (or SAD) is from the BMA definition named the "Best match" macro.

Figure 3:
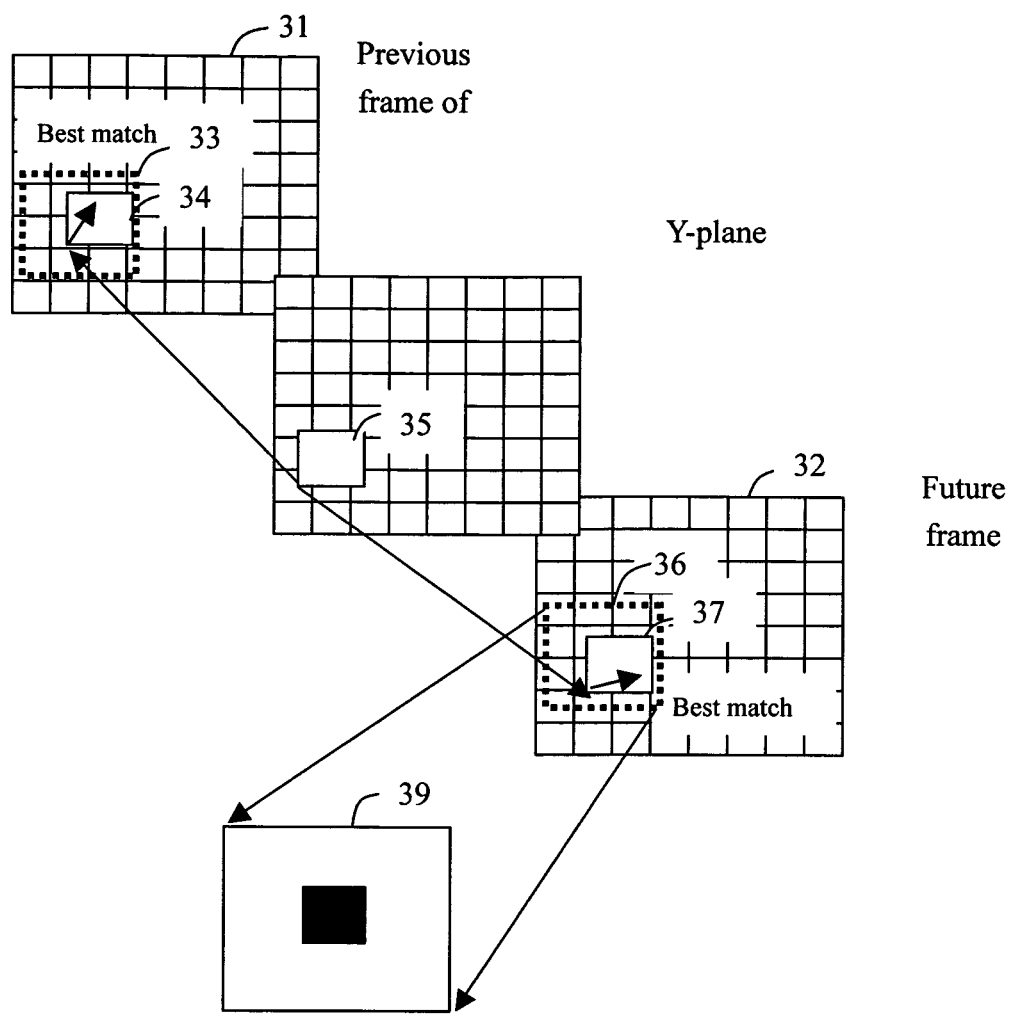
FIG. 3 illustrates the method of motion estimation for the best matching block searching which is the center of the video compression.
Figure 4:
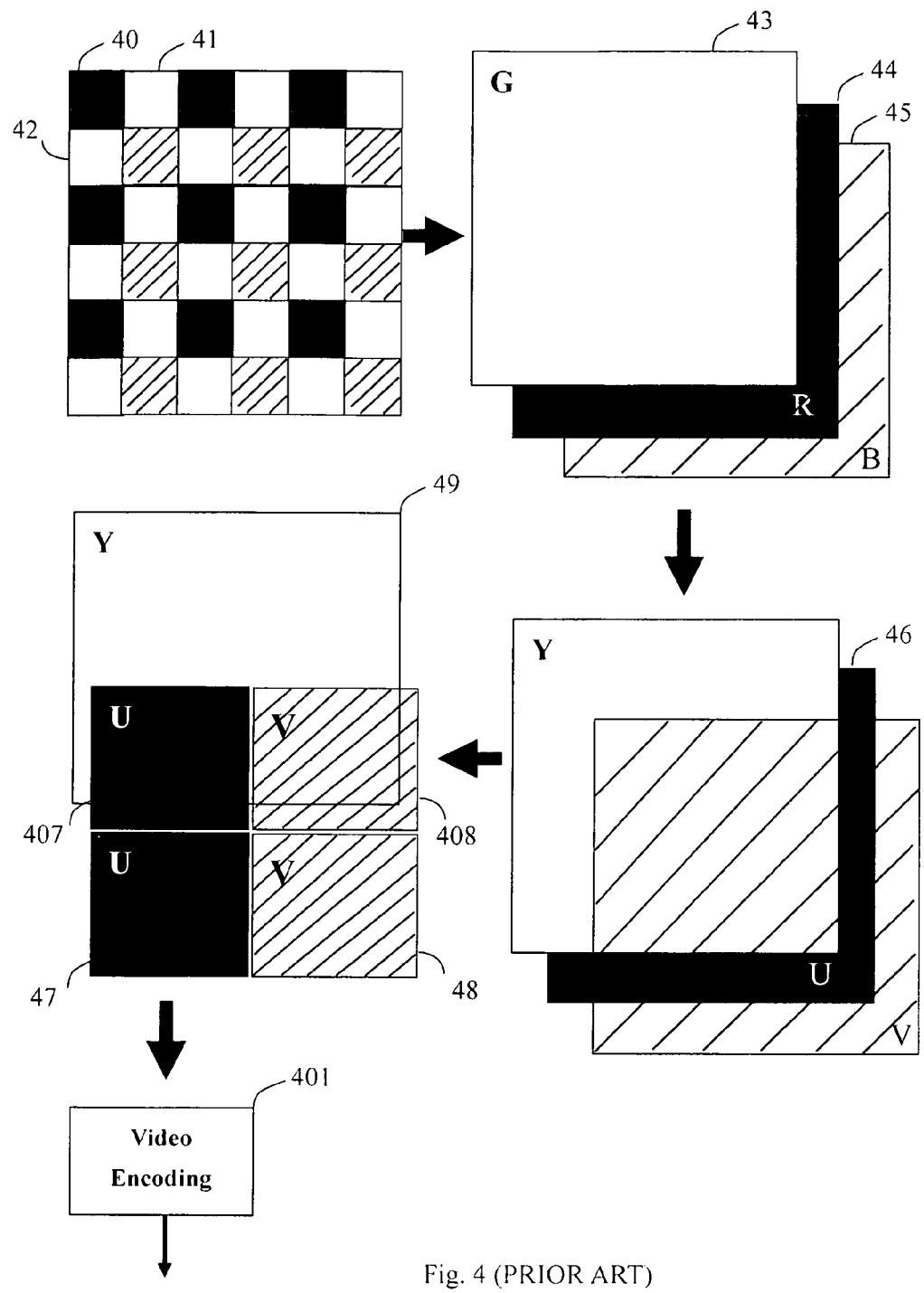
FIG. 4 illustrates the prior art procedure of the method of image capturing, converting the Raw data to RGB/YUV (420 and/or 422 formats) for video compression.
Figure 5:
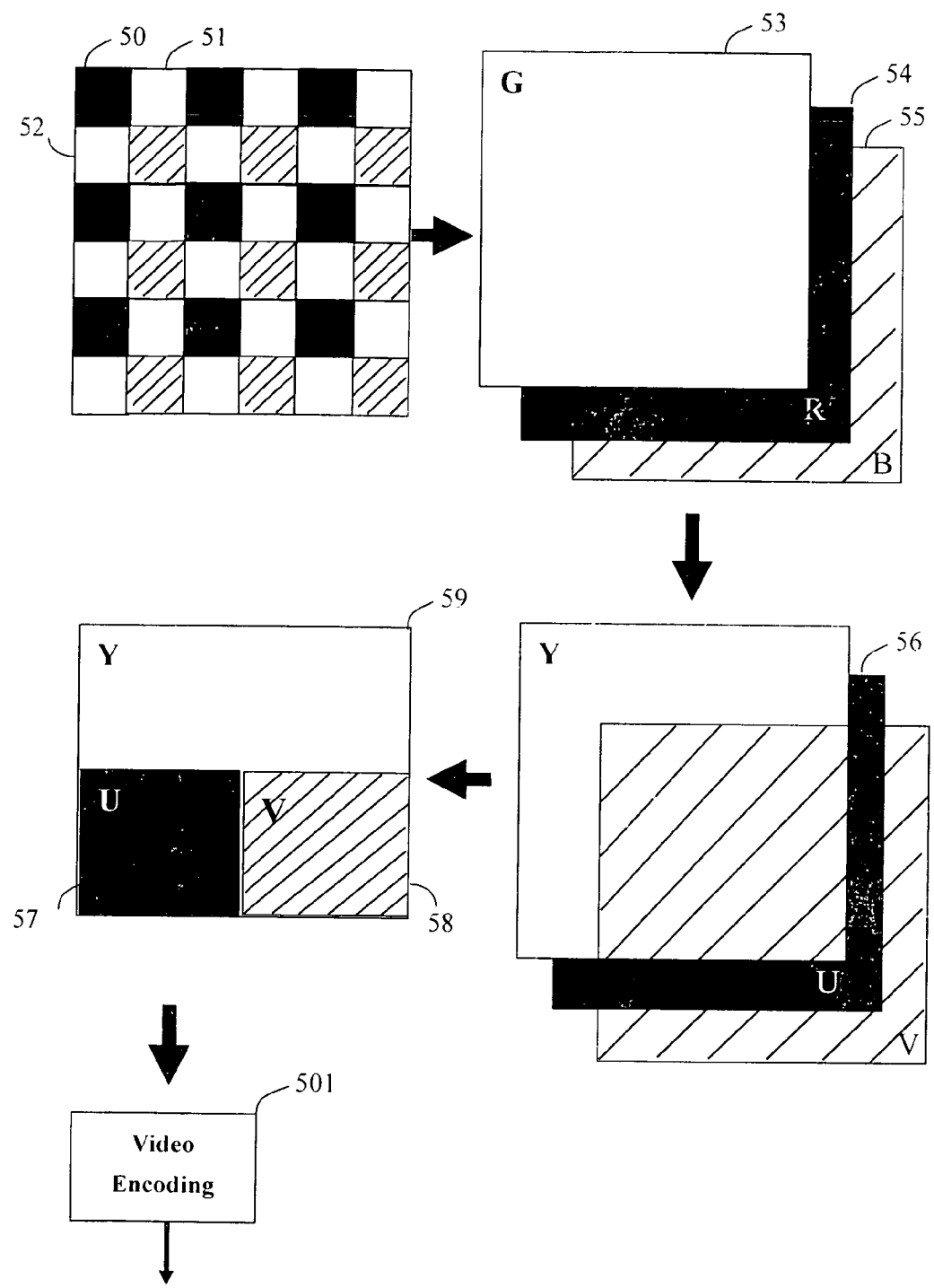
FIG. 5 illustrates the diagram of this invention of the high efficiency video compression with half of the Y-component compared to the conventional mean.

FIG. 3 depicts the best match macro searching and the depiction of the searching range. A motion estimator searches for the best match macro within a predetermined searching range 33, 36 by comparing the mean absolute difference, MAD, or sum of absolute differences, SAD. The block of a certain of position having the least MAD or SAD is identified as the "best match" block. Once the best matches are identified, the MV between the targeted block 35 and the best match's 34, 37 can then be calculated and the differences between each within a block can be coded accordingly. This kind of difference coding technique is called "Motion Compensation". The calculation of the motion estimation consumes most computing power in most video compression systems. In P-type coding, only a previous frame 31 is used as the reference, while in B-type coding, both previous frame 31 and the future frame 32 are referred. A full resolution video is constructed from the Bayer, or said the Mosaic pattern by interpolating the missing color components for every pixel from neighboring pixel values, a process typically referred to as "DeMosaicing".

An image is captured by an image sensor device which is comprised of image sensor cells with each sensor having predetermined color filter on top to select one of the Red, Green and Blue color to penetrate to the sensor cell. The DeMosaic RGB form the image of RGB domain which is the basic form of an image. In most digital image processing and compression, YUV (or YCbCr) format is commonly adopted. So, the RGB color planes are converted to be YUV 46 with each of Y, U or V component being converted by neighboring RGB components which mechanism is called "Color-Space-Conversion".

MPEG, a popular motion video compression algorithm takes Y, luminance and U/V chrominance as input components with data ratio of Y:U:V as said 4:2:0 (Y/U/V, 49, 47, 48) or 4:2:2 (Y/U/V, 49, 47, 407, 48, 408) which is also from down sampling mechanism. The raw image data 40, 41, 42 go through the image processing separately and come out of R-plane 44, G-plane 43 and B-plane 45 of pixels. The Y, U and V components are compressed separately.

This invention of efficient video compression applies a method of ISP and color-space-conversion to convert the Green component 52 to Y, Luminance, and shift up every other Y component to form a Y-plane 56. So the original R-plane 53, G-plane 54 and B-plane 55 are converted to Y-plane, U-plane and V-plane without interpolation and providing 4:2:2 format resulting in half the amount of the Y components 59 compared to the conventional method which interpolates and forms Y component of each pixel. The amount of U components 57 and V components 58 are still the same to the conventional method. In 4:2:0 format, there will be interpolation for the Y components in this invention.

Figure 6:
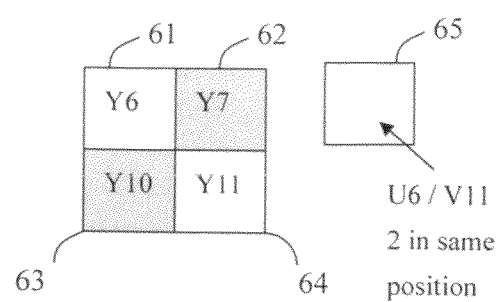
FIG. 6 shows the prior art of YUV positioning of each pixel within a frame.

The main disadvantage of the prior art motion video compression algorithm with DeMosaic RGB or YUV input is the interpolation error of the Y and the U components and shifted position of V components which is partially caused by interpolation. FIG. 6 explains the setback of the prior art conventional method of video compression. The Green components 62, 63 are converted to Y7, Y10 and further interpolated to be Y6 and Y11, 61, 64 which have more or less error from interpolation. The Blue cell in position as Y6 is converted to be U6 and the interpolated Red in position of same as Y11 is converted to be V11 has even more error caused not only from interpolation but also from shifted position 65. Which means that the conventional means of converting the Raw pixel to V component causes most error due to interpolation and position shifting.

Figure 7:
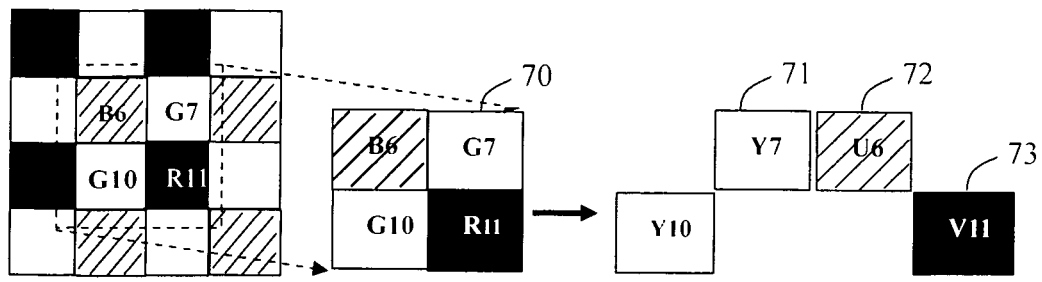
FIG. 7 illustrates the invention of more accurately converting the YUV according to the original position of R, G and B component and how the YUV planes are converted from the Raw pixels.

FIG. 7 depicts the present invention of the efficient video compression converting the raw pixel data without interpolating the data in the step of the color-space-conversion. Which means this invention does not create additional U or V component which are absent in "Green" pixel cells. This method has two advantages: it has no interpolation error from adjacent pixels and accurate position of converting the U and V component compared to the prior art, the conventional approach. This method results in visually better image quality and higher PSNR, Peak Signal Noise Ratio, under a specific bit rate with saving of temporary image buffer and less power consumption in image data transferring from the image sensor to another circuitry for image processing and video compression.

For the U and V component point of view, the present invention of the efficient video compression converts the raw pixel data 70 without interpolating the data from adjacent pixels. The Green cells are converted to be Y components 71. Which means this invention does not create additional U or V component which is absent in the position having "Red" or "Blue cell. From another word, the pixel cells with "Blue" will be converted to be U component 72, and the cells with "Red" will be converted to be "V" component 73.

Figure 8:
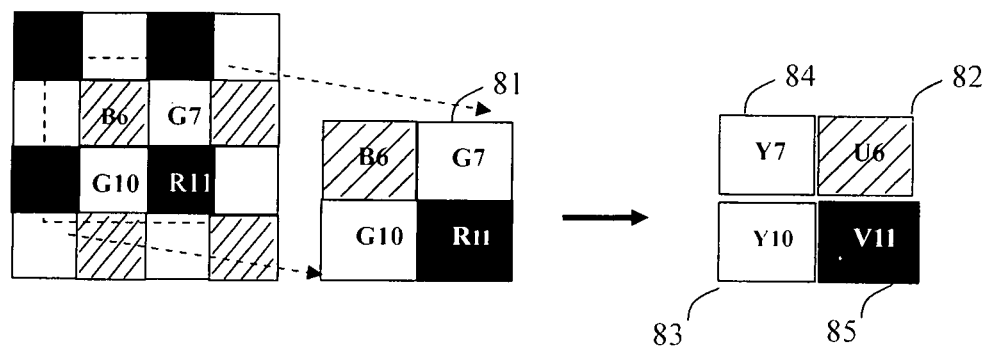
FIG. 8 illustrates the invention of more accurately converting the YUV according to the original position of R, G and B component.

Therefore, this invention has more accurate color-space-conversion method reaching all corresponding YUV components in the right position of original Red, Green and Blue pixel cells as shown in FIG. 8. The zoomed in picture of four pixels shows that two Green cells surrounding by Blue and Red pixel cells 81 is converted to be 2 Y components 82, 83 surrounded by an adjacent U component 84 and another adjacent V component 85.

When all Y, U and V components are accurately generated from the raw pixels through some procedures of image signal processing and color-space-conversion, the sequential images forming motion video are input to a video compression engine for reducing the redundant information which details are disclosed in above paragraphs.

Figure 9:
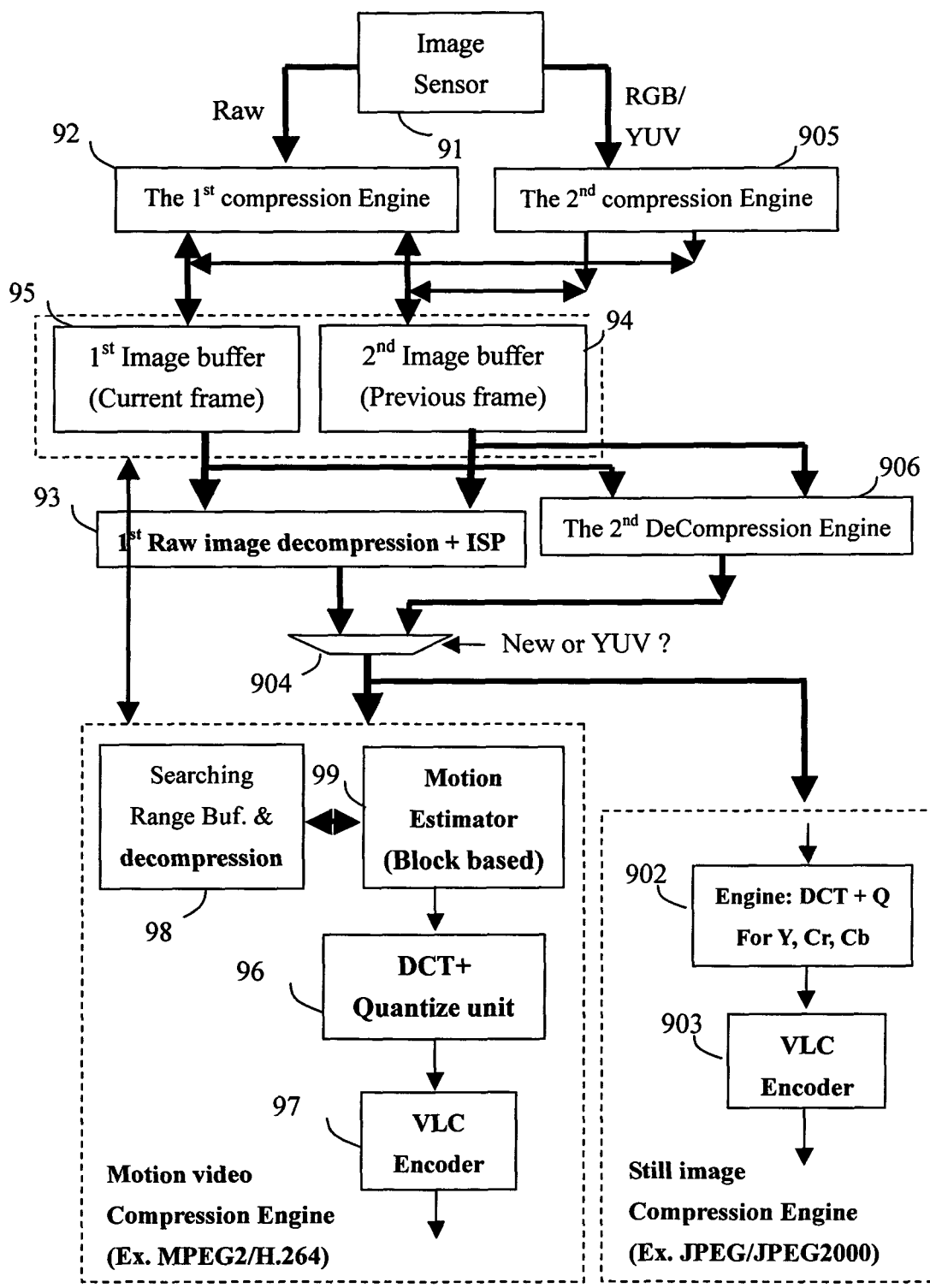
FIG. 9 shows the diagram of this invention which includes high efficient motion video compression unit and the still image compression unit with the referencing frame buffer compression codec.

For saving data rate between the image sensor and the video compression engine, the said lossless or "near lossless" compression method is applied to reduce the image data as shown in FIG. 9. The $1^{st}$ compression engine 92 reduces the data rate of the raw image captured by an image sensor 91 and saves in the temporary pixel buffer which can be comprised of the $1^{st}$ temporary image buffer 95 for storing the "Current frame" and the $2^{nd}$ temporary image buffer 94 for storing the "Previous frame". When a timing matched for video compression, the predetermined region of compressed raw image is accessed and decompressed for a certain of manipulations like image signal processing, ISP, and color-space-conversion before being sent to the video compression engine for further video compression which includes Motion Estmation 99, DCT+Quantization 96 and VLC coding 97. Those pixels within the "Searching range" should be decompressed 98 block by block with predetermined fixed amount of pixels each block and recovered to calculate the SAD values. Another raw image decompression engine 906 recovers the predetermined searching range of pixels of the previous image frame. This invention also adopts conventional method of video compression by accepting image from the image sensor with conventional way of ISP and color-space-conversion to the YUV format. A Mux 904 selects image input to the video compression engine from the convention path or from this invention.

Some image sensor devices have included ISP even color-space-conversion features inside a single device and provide output image with YUV or RGB format which this invention can adopt and apply a second compression engine 905 to reduce the image data rate and temporarily save into frame buffers 94, 95 for further video compression. A second decompression engine 906 reconstructs the YUV or RGB pixels and feeds into the video compression engine.

Similar to the video compression, this invention of efficient raw data video compression can be applied to the still image compression. The recovered raw image can be converted to YUV through similar procedure as described above and be fed to an image compression engine which might include a DCT+quantization unit 902 followed by a VLC encoder 903 and a formatter. Applications of this invention of raw image directly video compression might include but not limited to MPEG1, MPEG2, MPEG4, Flash video, H.261, H.263, H.264, H.265 . . . etc. video compression algorithms. In the still image compression algorithms including but not limited to JPEG, JPEG2000, JBIG, PNG . . . etc can use this invention of raw image compression.

It will be apparent to those skills in the art that various modifications and variations can be made to the structure of the present invention without departing from the scope or the spirit of the invention. In the view of the foregoing, it is intended that the present invention cover modifications and variations of this invention provided they fall within the scope of the following claims and their equivalents.

What is claimed is:

1. A method of compressing the captured video images, comprising:
    applying a mechanism of image signal processing and color-space-conversion to convert the Green components to be Y, the luminance components only for those pixels capturing the raw Green data;
    applying a mechanism of image signal processing and color-space-conversion to convert the Blue components to be U, the chrominance components for only those pixels capturing the raw Blue data;

applying a mechanism of image signal processing and color-space-conversion to convert the Red components to be V, the chrominance components for only those pixels capturing the raw Red data; and applying a predetermined video compression algorithm to compress the Y, U and V components which are generated from above image signal processing and color-space-conversion methods.

2. The method of claim 1, wherein an analog-to-digital convert circuit is applied to transform the captured image signal temporarily stayed in the image sensor cell into digital format with one color representation per pixel.

3. The method of claim 1, wherein the image signal processing and color-space-conversion of the Green components which are originally captured by the image sensor cell with Green color filter on top of the cell to selectively let Green light to penetrate into the sensor cell.

4. The method of claim 1, wherein the image signal processing and color-space-conversion of the Red components which are originally captured by the image sensor cell with Red color filter on top of the cell to selectively let Red light to penetrate into the sensor cell.

5. The method of claim 1, wherein the image signal processing and color-space-conversion of the Blue components which are originally captured by the image sensor cell with Blue color filter on top of the cell to selectively let Blue light to penetrate into the sensor cell.

6. The method of claim 1, wherein the length of bits to represent the digitized image pixels is fixed for each captured image which is one of 6 bits, 8 bits, 10 bits, 12 bits, 14 bits or 16 bits.

7. The method of claim 1, wherein in providing the 4:2:0 format of YUV components input to a specific video compression, there are Y components generated from interpolation means by the surrounding pixels.

8. The method of claim 1, wherein in providing the 4:2:2 format of YUV components input to a specific video compression, there is no Y components generated from interpolation means.

9. An apparatus of video capturing and video compression achieving low power consumption, comprising an image sensor capturing the light and digitizing the pixel data and a device executes the image signal processing;

a circuit converting the raw Green, Red, and Blue color components to Y, V and U component with the Y components from Green pixels, the U components from the Blue pixels and the V components from the Red pixels;

the first compression unite reducing the YUV components and saves into the temporary image buffer;

a first decompression unite recovering the corresponding region of pixels of compressed YUV components; and a video compression device adopting the image of Y, U and V components and reducing the intra and inter frame redundancy and the data rate.

10. The apparatus of claim 9, wherein the raw pixel data or image pixels which has gone through the image processing can be input to a predetermined compression engine, if the input are raw pixels, the first compression device is applied to reduce the data rate, while, if the input are pixels gone through image signal processing, the second compression engine is applied to reduce the pixel data rate.

11. The apparatus of claim 9, wherein the second compression engine is a still image compression engine to compress the captured image with RGB or YUV format output from the image sensor.

12. The apparatus of claim 9, wherein the video compression engine informs the first raw pixel decompression engine to recover the specific range of pixels for decompression and image processing before being fed to the video compression engine for motion estimation and video compression.

13. The apparatus of claim 9, wherein the video compression engine informs the second pixel decompression engine to recover the specific range of pixels for decompression and feed to the video compression engine for motion estimation and video compression.

14. The apparatus of claim 9 wherein the engine with block based decompression, image signal processing and a color-space conversion operates for recovering raw pixel data, color processing of each pixel and converting the RGB to YCrCb format to fit the resolution and pixel format if YCrCb format is predetermined for the still image or motion video compression.

* * * * *